United States Patent
Chen et al.

(10) Patent No.: US 10,345,946 B2
(45) Date of Patent: Jul. 9, 2019

(54) DISPLAY DEVICE CAPABLE OF AVOIDING MURA FOR IMPROVING THE DISPLAY EFFECT OF THE TOUCH PANEL

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Gui Chen, Guangdong (CN); Jingfeng Xue, Guangdong (CN); Shibo Zhou, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 101 days.

(21) Appl. No.: 14/778,310
(22) PCT Filed: Apr. 23, 2015
(86) PCT No.: PCT/CN2015/077267
§ 371 (c)(1),
(2) Date: Dec. 6, 2016
(87) PCT Pub. No.: WO2016/155059
PCT Pub. Date: Oct. 6, 2016

(65) Prior Publication Data
US 2017/0102811 A1   Apr. 13, 2017

(30) Foreign Application Priority Data
Mar. 31, 2015   (CN) .......................... 2015 1 0147282

(51) Int. Cl.
*G06F 3/045* (2006.01)
*G06F 3/041* (2006.01)
(Continued)

(52) U.S. Cl.
CPC ........ *G06F 3/0416* (2013.01); *G02F 1/13338* (2013.01); *G06F 3/044* (2013.01);
(Continued)

(58) Field of Classification Search
CPC ...... G06F 3/0416; G06F 3/0412; G06F 3/044; G06F 3/041; G06F 2203/04111
See application file for complete search history.

(56) References Cited

U.S. PATENT DOCUMENTS 8,228,309 B2 *   7/2012   Tamaki ................. G06F 3/0412
                                                                  345/173
9,639,205 B2 *   5/2017   Kim ...................... G06F 3/0412
(Continued)

FOREIGN PATENT DOCUMENTS

CN   101295720   10/2008
CN   103870050    6/2014
(Continued)

OTHER PUBLICATIONS

Search Report and Written Opinion, dated Aug. 26, 2015, for International Application No. PCT/CN2015/077267.
(Continued)

*Primary Examiner* — Vijay Shankar
(74) *Attorney, Agent, or Firm* — Mintz Levin Cohn Ferris Glovsky and Popeo, P.C.; Kongsik Kim (57) ABSTRACT

The present disclosure relates to the technical field of display, whereby the technical problem of mura of the touch panel can be solved. In the touch panel, each first signal line, after being electrically connected with a corresponding touch electrode, further extends to one end of the touch panel far from the driving circuit, so that each touch electrode overlaps with a group of first signal lines that are connected with the column of touch electrodes including the touch electrode. The touch panel according to the present disclosure can be used in liquid crystal television, liquid crystal display device, mobile phone, tablet personal computer and other display devices.

10 Claims, 7 Drawing Sheets

(51) Int. Cl.
  *G06F 3/044* (2006.01)
  *G02F 1/1333* (2006.01)
  *G02F 1/1362* (2006.01)

(52) U.S. Cl.
  CPC ............. *G02F 1/136286* (2013.01); *G06F 2203/04111* (2013.01)

(56) References Cited

U.S. PATENT DOCUMENTS 9,678,594 B2 * 6/2017 Wang ................. G02F 1/13
9,886,113 B2 * 2/2018 Choi .................. G02F 1/13338
10,031,627 B2 * 7/2018 Wang ................. G06F 3/0412

FOREIGN PATENT DOCUMENTS

| CN | 104020891 | 9/2014 |
| CN | 104020910 | 9/2014 |
| CN | 104035639 | 9/2014 |
| WO | 2010088666 | 8/2010 |

OTHER PUBLICATIONS

Office Action and Search report, dated May 18, 2017, for Chinese patent Application No. 201510147282.2.

\* cited by examiner

DISPLAY DEVICE CAPABLE OF AVOIDING MURA FOR IMPROVING THE DISPLAY EFFECT OF THE TOUCH PANEL

CROSS REFERENCE TO RELATED APPLICATION

The present application claims benefit of Chinese patent application CN 201510147282.2, entitled "Touch Panel and Display Device" and filed on Mar. 31, 2015, the entirety of which is incorporated herein by reference.

FIELD OF THE INVENTION

The present disclosure relates to the technical field of display, and particularly to a touch panel and a display device.

BACKGROUND OF THE INVENTION

A touch screen, which is also referred to as a touch panel, is an inductive liquid crystal display device which can receive input signals such as finger touch and the like. The capacitive touch technology is a kind of touch technology taking advantage of the capacitance change when a finger touches a capacitive touch panel. The capacitive touch technology comprises self capacitive touch technology and mutual capacitive touch technology. According to the self capacitive touch technology, a touch electrode array (which is made of a transparent conductive material) is formed on a surface of a glass, and the touch electrodes of the array and the ground can form capacitors.

The finger would take away the charge of some capacitors when it touches the self capacitive touch screen. The self capacitive touch screen then detects the touch electrode array in sequence, and determines the positions of the touch points according to the charge change before and after touch, so as to make a response to the touch operation of the user.

Figure 1:
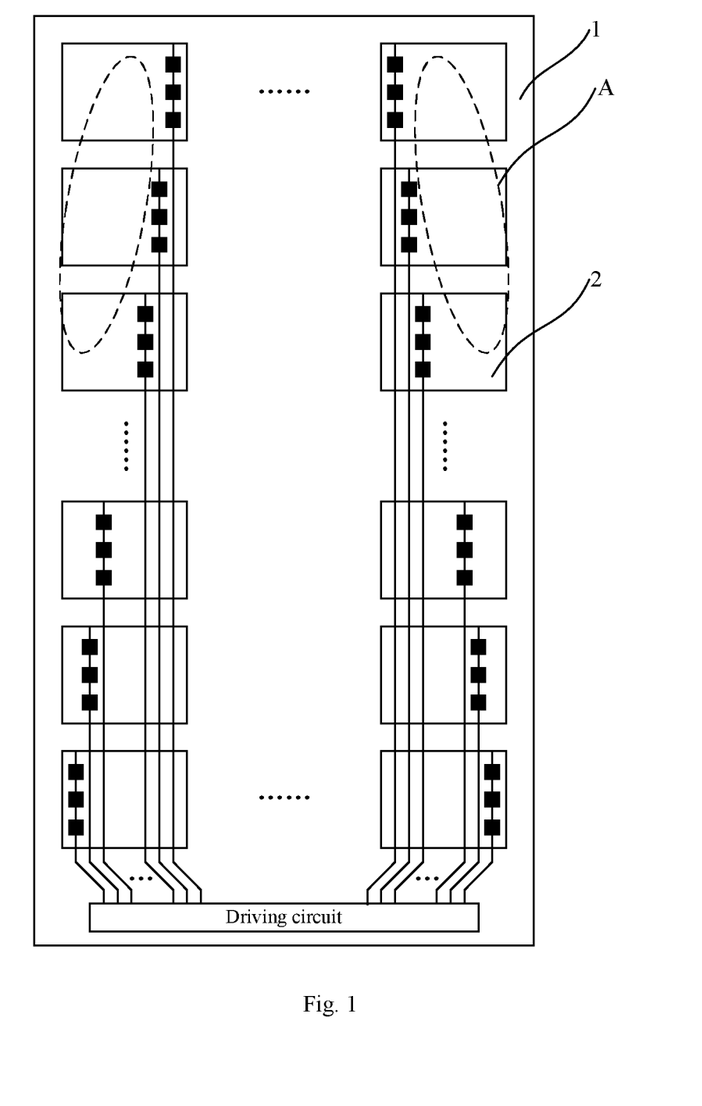
FIG. 1 schematically shows touch electrodes and touch wirings in the prior art.

The self capacitive touch screen in the prior art is shown in FIG. 1, wherein a plurality of touch wirings extend from the driving circuit of the touch panel, and each touch wiring is connected with a corresponding touch electrode. Since the lengths of the touch wirings are different from one another, the density of the first signal lines is low in some areas (for example, area A as shown in FIG. 1). In this case, the deflection of the liquid crystal molecules in these areas is affected, and thus mura would occur on the screen. Consequently, the display effect of the self capacitive touch screen would be affected seriously, and the user experience would be suffered.

SUMMARY OF THE INVENTION

The present disclosure aims to provide a touch panel and a display device so as to solve the technical problem of mura of the touch panel.

According to a first aspect, the present disclosure provides a touch panel, comprising a plurality of touch electrodes that are arranged in an array and are insulated from one another, and a driving circuit that is arranged at one end of the touch panel, wherein each touch electrode is connected with the driving circuit through a corresponding one of first signal lines, and is insulated from other ones of the first signal lines; and wherein each first signal line, after being electrically connected with a corresponding touch electrode, further extends toward the other end of the touch panel, so that each touch electrode overlaps with a group of first signal lines that are connected with a column of touch electrodes including said touch electrode.

The touch electrodes and the first signal lines are arranged in different layers.

The driving circuit is located at a lower end of the touch electrodes that are arranged in an array; each column of touch electrodes comprises a first to an $m^{th}$ touch electrodes from bottom up, and a group of first signal lines that are connected with the column of touch electrodes comprise a first to an $m^{th}$ first signal lines from left to right; and the first, the second, . . . , the $(m-1)^{th}$, and the $m^{th}$ ones of the first signal lines are electrically connected with the first, the second, . . . , the $(m-1)^{th}$, and the $m^{th}$ ones of the touch electrodes respectively.

The driving circuit is located at a lower end of the touch electrodes that are arranged in an array; each column of touch electrodes comprises a first to an $m^{th}$ touch electrodes from bottom up, and a group of first signal lines that are connected with the column of touch electrodes comprise a first to an $m^{th}$ first signal lines from left to right; and the first, the second, . . . , the $(m-1)^{th}$, and the $m^{th}$ ones of the first signal lines are electrically connected with the $m^{th}$, the $(m-1)^{th}$, . . . , the second, and the first ones of the touch electrodes respectively.

The driving circuit is located at a lower end of the touch electrodes that are arranged in an array; each column of touch electrodes comprises a first to an $m^{th}$ touch electrodes from bottom up, and a group of first signal lines that are connected with the column of touch electrodes comprise a first to an $m^{th}$ first signal lines from left to right; and the first, the third, the fifth, . . . ones of the first signal lines are electrically connected with the first, the second, the third, . . . ones of the touch electrodes respectively, and the second, the fourth, the sixth, . . . ones of the first signal lines are electrically connected with the $m^{th}$, the $(m-1)^{th}$, the $(m-2)^{th}$, . . . ones of the touch electrodes respectively.

The driving circuit is located at a lower end of the touch electrodes that are arranged in an array; each column of touch electrodes comprises a first to an $m^{th}$ touch electrodes from bottom up, and a group of first signal lines that are connected with the column of touch electrodes comprise a first to an $m^{th}$ first signal lines from left to right; and the first, the third, the fifth, . . . ones of the first signal lines are electrically connected with the $m^{th}$, the $(m-1)^{th}$, the $(m-2)^{th}$, . . . ones of the touch electrodes respectively, and the second, the fourth, the sixth, . . . ones of the first signal lines are electrically connected with the first, the second, the third, . . . ones of the touch electrodes respectively.

The touch panel further comprises second signal lines that are arranged between any two columns of touch electrodes, wherein all the second signal lines are electrically connected with the driving circuit.

The touch panel is used for display or touch in a time-shared manner; when the touch panel is used for display, the first signal lines and the second signal lines all receive a common electrode signal from the driving circuit; and when the touch panel is used for touch, the first signal lines receive a touch signal from the driving circuit, while the second signal lines are connected with the ground through the driving circuit.

The touch panel further comprises third signal lines that are connected with the driving circuit, wherein two third signal lines extending from the driving circuit surround an area that is provided with the touch electrodes, are connected with each other and with each second signal line at the other end of the touch panel; and wherein the second signal lines each are insulated from the driving circuit and are electrically connected with the driving circuit through the third signal lines.

The following beneficial effects can be brought about by the present disclosure. According to the embodiments of the present disclosure, since each first signal line further extends to one end of the touch panel far from the driving circuit after being electrically connected with a corresponding touch electrode, i.e., each touch electrode overlaps with a group of first signal lines that are connected with the column of touch electrodes including said touch electrode, with regard to any cross section of the touch panel along a direction perpendicular to the extending direction of the first signal lines, the first signal lines contained therein would have the same number and the same positions. In the touch panel, the electric field generated by the first signal lines is distributed in a relatively uniform manner, and the mura of the panel can be prevented. Therefore, the display effect of the touch panel can be improved, and thus the user experience can be guaranteed.

According to a second aspect, the present disclosure provides a display device, which comprises the aforesaid touch panel.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The drawings necessary for explaining the embodiments are introduced briefly below to illustrate the technical solutions of the embodiments of the present disclosure more clearly.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

Figure 2:
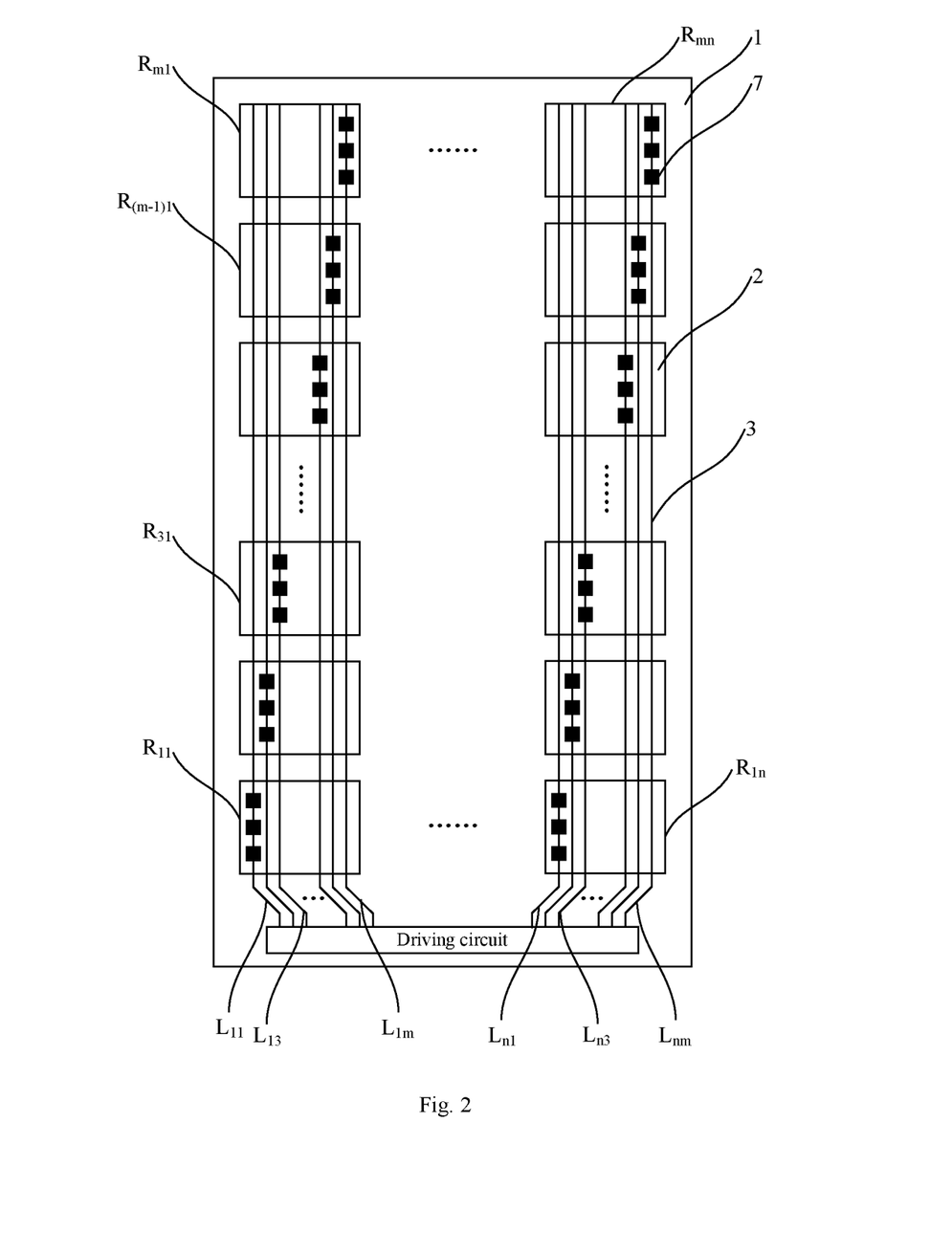
FIG. 2 to FIG. 5 schematically show of touch electrodes and first signal lines according to the embodiments of the present disclosure.

The embodiment of the present disclosure provides a touch panel 1. As shown in FIG. 2, the touch panel 1 comprises a plurality of touch electrodes 2 that are arranged in an array and are insulated from one another and a driving circuit that is arranged at one end of the touch panel, wherein each touch electrode 2 is connected with the driving circuit through a corresponding first signal line 3 and is insulated from other first signal lines 3 so as to ensure the normal operation of the touch panel 1.

According to the embodiment of the present disclosure, in order to improve the extent of uniformity of the electric field that is generated by the first signal lines 3 on the touch panel 1, each first signal line 3, after being electrically connected with a corresponding touch electrode 2, further extends to one end of the touch panel 1 far from the driving circuit, so that each touch electrode 2 overlaps with a group of first signal lines that are connected with the column of touch electrodes 2 including said touch electrode. In order to prevent the first signal line 3 from being electrically connected with a touch electrode 2 other than its corresponding touch electrode 2, thereby affecting the normal operation of the touch panel 1, the touch electrodes 2 and the first signal lines are arranged in different layers. An insulation layer 6 is arranged between the first signal lines 3 and the touch electrodes 2, and the first signal lines 3 each are connected with a corresponding touch electrode 2 through a via hole 7 in the insulation layer 6.

Therefore, according to the embodiments of the present disclosure, since each first signal line, after being electrically connected with a corresponding touch electrode 2, further extends to one end of the touch panel far from the driving circuit, i.e., each touch electrode 2 overlaps with a group of first signal lines 3 that are connected with the column of touch electrodes 2 including said touch electrode, with regard to any cross section of the touch panel along a direction perpendicular to the extending direction of the first signal lines, the first signal lines contained therein would have the same number and the same positions. In the touch panel 1, the electric field generated by the first signal lines 3 is distributed in a relatively uniform manner, and the mura of the panel can be prevented. Therefore, the display effect of the touch panel 1 can be improved, and thus the user experience can be guaranteed.

Further, in the touch panel 1 according to the embodiments of the present disclosure, the first signal lines 3 and the touch electrodes 2 can be connected with each other in various manners. The connection modes between the first signal lines 3 and the touch electrodes 2 will be specifically illustrated below with reference to several examples. However, the examples are not intended to restrict the scope of the present disclosure.

It should be noted that, in the following examples, the touch panel 1 is provided with m rows×n columns of touch electrodes $R_{xy}$ ($R_{11}$~$R_{m1}$~$R_{1n}$~$R_{mn}$) that are insulated from one another, and a driving circuit. Each touch electrode $R_{xy}$ is connected with the driving circuit through one single first signal line $L_{yx}$. Specifically, each touch electrode $R_{xy}$ has a rectangular shape. The touch electrodes $R_{xy}$ and the first signal lines $L_{yx}$ are arranged in different layers and are made of Indium Tin Oxide (ITO) or other transparent conductive materials. Each touch electrode $R_{xy}$ is connected with a corresponding first signal line $L_{yx}$ through a via hole 7. According to the present embodiment, the number of the via hole 7 is three, and can be selected according to actual situations. In the foregoing, x=1, 2, 3, . . . , m, and y=1, 2, 3, . . . , n.

Example 1

As shown in FIG. 2, the driving circuit is located at a lower end with regard to the touch electrodes 2 that are arranged in an array. Each column of touch electrodes comprises a first to an $m^{th}$ touch electrodes $R_{1y}$~$R_{my}$ from bottom up, and a group of first signal lines that are connected with the column of touch electrodes $R_{1y}$~$R_{my}$ comprise a first to an $m^{th}$ first signal lines $L_{y1}$~$L_{ym}$ from left to right. The first, the second, . . . , the $(m-1)^{th}$, and the $m^{th}$ ones of the first signal lines are electrically connected with the first, the second, . . . , the $(m-1)^{th}$, and the $m^{th}$ ones of the touch electrodes in sequence.

Specifically, taking the first column of touch electrodes $R_{11}$~$R_{m1}$ as an example, the first column of touch electrodes $R_{11}$~$R_{m1}$ each are connected with the driving circuit through the first group of first signal lines $L_{11}$~$L_{1m}$ in sequence. Similarly, with respect to the $n^{th}$ column of touch electrodes $R_{1n}$~$R_{mn}$, the touch electrodes 2 thereof each are connected with the driving circuit through the first signal lines $L_{n1}$~$L_{nm}$ in sequence.

Example 2

Figure 3:
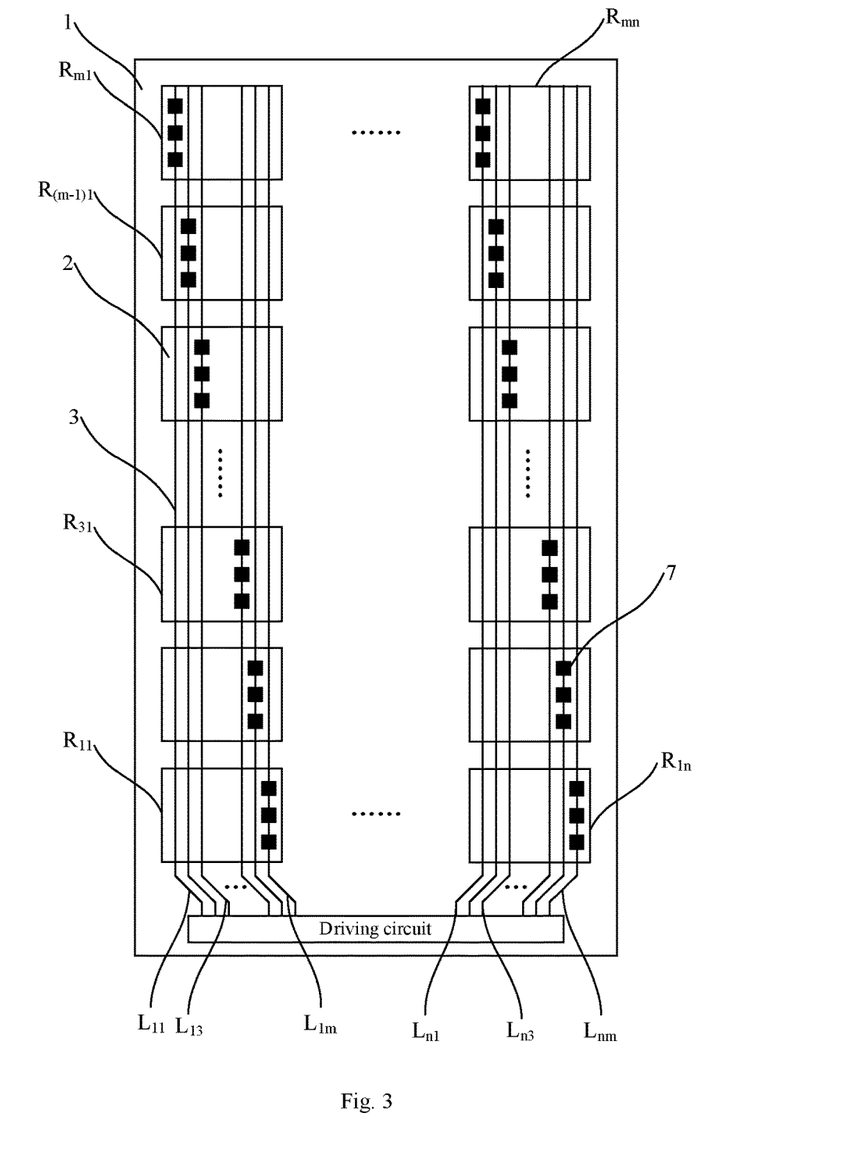

As shown in FIG. 3, the driving circuit is located at a lower end with regard to the touch electrodes that are arranged in an array. Each column of touch electrodes comprises a first to an $m^{th}$ touch electrodes $R_{1y}$~$R_{my}$ from bottom up, and a group of first signal lines that are connected with the column of touch electrodes $R_{1y}$~$R_{my}$ comprise a first to an $m^{th}$ first signal lines $L_{y1}$~$L_{ym}$ from left to right. The first, the second, . . . , the $(m-1)^{th}$, and the $m^{th}$ ones of the first signal lines are electrically connected with the $m^{th}$, the $(m-1)^{th}$, . . . , the second, and the first ones of the touch electrodes in sequence.

Specifically, taking the first column of touch electrodes $R_{11}$~$R_{m1}$ as an example, the first column of touch electrodes $R_{11}$~$R_{m1}$ each are connected with the driving circuit through the first group of first signal lines $L_{1m}$~$L_{11}$ in sequence. Similarly, with respect to the $n^{th}$ column of touch electrodes $R_{1n}$~$R_{mn}$, the touch electrodes 2 thereof each are connected with the driving circuit through the first signal lines $L_{nm}$~$L_{n1}$ in sequence.

It is obvious that, example 2 is a simple variant of example 1.

Example 3

Figure 4:
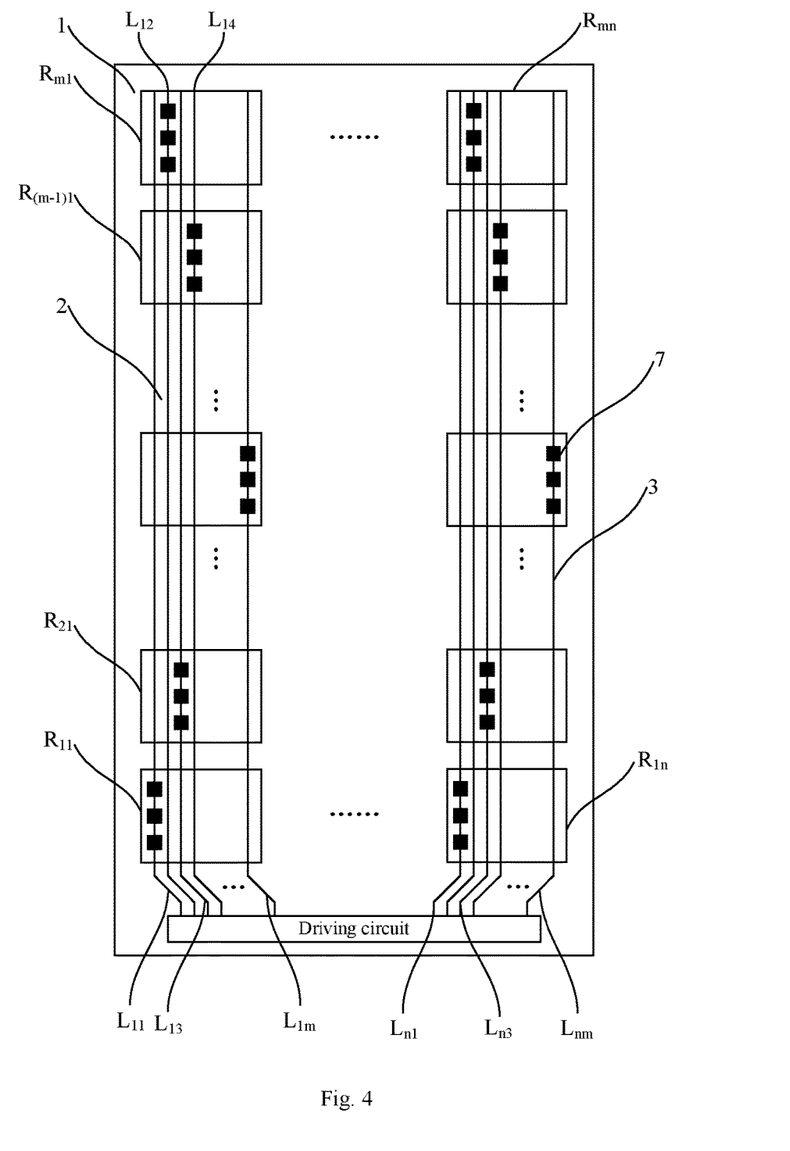

As shown in FIG. 4, the driving circuit is located at a lower end with regard to the touch electrodes that are arranged in an array. Each column of touch electrodes comprises a first to an $m^{th}$ touch electrodes $R_{1y}$~$R_{my}$ from bottom up, and a group of first signal lines that are connected with the column of touch electrodes $R_{1y}$~$R_{my}$ comprise a first to an $m^{th}$ first signal lines $L_{y1}$~$L_{ym}$ from left to right. The first, the third, the fifth, . . . ones of the first signal lines are electrically connected with the first, the second, the third, . . . ones of the touch electrodes in sequence, and the second, the fourth, the sixth, . . . ones of the first signal lines are electrically connected with the $m^{th}$, the $(m-1)^{th}$, the $(m-2)^{th}$, . . . ones of the touch electrodes in sequence.

Specifically, taking the first column of touch electrodes $R_{11}$~$R_{m1}$ as an example, the first column of touch electrodes $R_{11}$~$R_{m1}$ each are connected with the driving circuit through the first group of first signal lines $L_{11}$~$L_{1m}$. The group of first signal lines $L_{11}$~$L_{1m}$ are divided into an odd-numbered group and an even-numbered group, wherein the odd-numbered group of first signal lines comprise odd-numbered first signal lines $L_{11}$, $L_{13}$, . . . , and the even-numbered group of first signal lines comprise even-numbered first signal lines $L_{12}$, $L_{14}$, . . . . The odd-numbered group of first signal lines $L_{11}$, $L_{13}$, . . . are connected with the touch electrodes $R_{11}$, $R_{21}$, . . . in sequence from the bottom end of the column of touch electrodes $R_{11}$~$R_{m1}$, while the even-numbered group of first signal lines $L_{12}$, $L_{14}$, . . . are connected with the touch electrodes $R_{m1}$, $R_{(m-1)1}$, . . . in sequence from the top end of the column of touch electrodes $R_{11}$~$R_{m1}$. The last first signal line $L_{1m}$ is connected with a touch electrode at a middle position of the column of touch electrodes $R_{11}$~$R_{m1}$.

Example 4

Figure 5:
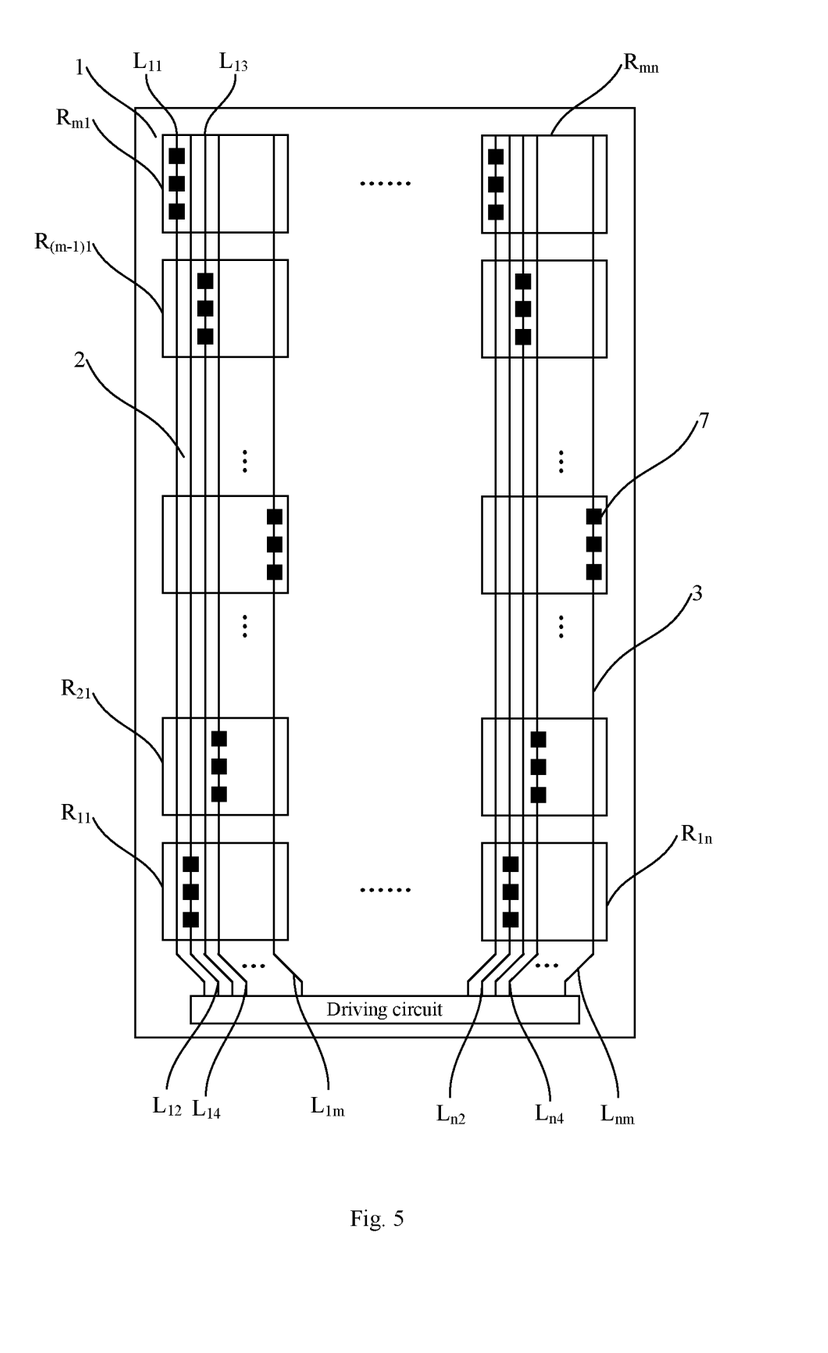

As shown in FIG. 5, the driving circuit is located at a lower end with regard to the touch electrodes that are arranged in an array. Each column of touch electrodes comprises a first to an $m^{th}$ touch electrodes $R_{1y}$~$R_{my}$ from bottom up, and a group of first signal lines that are connected with the column of touch electrodes $R_{1y}$~$R_{my}$ comprise a first to an $m^{th}$ first signal lines $L_{y1}$~$L_{ym}$ from left to right. The first, the third, the fifth, . . . ones of the first signal lines are electrically connected with the $m^{th}$, the $(m-1)^{th}$, the $(m-2)^{th}$, . . . ones of the touch electrodes in sequence, and the second, the fourth, the sixth, . . . ones of the first signal lines are electrically connected with the first, the second, the third, . . . ones of the touch electrodes in sequence.

Specifically, taking the first column of touch electrodes $R_{11}$~$R_{m1}$ as an example, the first column of touch electrodes $R_{11}$~$R_{m1}$ each are connected with the driving circuit through the first group of first signal lines $L_{11}$~$L_{1m}$. The group of first signal lines $L_{11}$~$L_{1m}$ are divided into an odd-numbered group and an even-numbered group, wherein the odd-numbered group of first signal lines comprise odd-numbered first signal lines $L_{11}$, $L_{13}$, . . . , and the even-numbered group of first signal lines comprise even-numbered first signal lines $L_{12}$, $L_{14}$, . . . . The odd-numbered group of first signal lines $L_{11}$, $L_{13}$, . . . are connected with the touch electrodes $R_{m1}$, $R_{(m-1)1}$, . . . in sequence from the up end of the column of touch electrodes $R_{11}$~$R_{m1}$, while the even-numbered group of first signal lines $L_{12}$, $L_{14}$, . . . are connected with the touch electrodes $R_{11}$, $R_{21}$, . . . in sequence from the bottom end of the column of touch electrodes $R_{11}$~$R_{m1}$. The last first signal line $L_{1m}$ is connected with a touch electrode at a middle position of the column of touch electrodes $R_{11}$~$R_{m1}$.

It is obvious that, example 4 is a simple variant of example 3.

In addition to the aforesaid four examples, the touch electrodes 2 of each column of touch electrodes each can be connected with the first signal lines 3 corresponding to the column of touch electrodes in other manners. The distribution uniformity of the electric field of the touch panel 1 can be improved as long as it can be guaranteed that each touch electrode 2 is connected with only one of the first signal lines 3, and thus the mura of the panel can be avoided.

Figure 6:
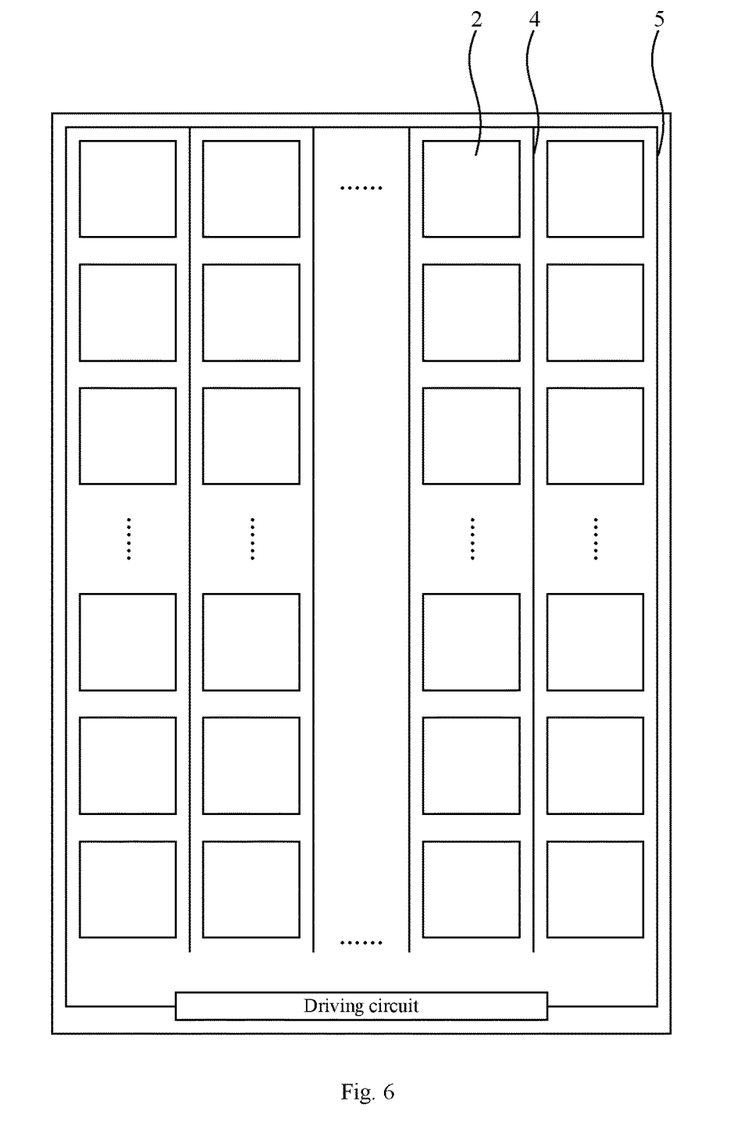
FIG. 6 schematically shows second signal lines, third signal lines and the touch electrodes according to an embodiment of the present disclosure.

The areas that are provided with touch electrodes 2 are all provided with the first signal lines 3. However, since the areas between two columns of touch electrodes are not provided with the first signal lines 3, the density of the electric field formed by the first signal lines 3 in areas between two columns of touch electrodes is low, and thus the uniformity of the electric field on the whole touch panel 1 is not satisfactory. Therefore, according to the embodiment of the present disclosure, as shown in FIG. 6, the touch panel 1 further comprises second signal lines 4 that are arranged between any two columns of touch electrodes, and each second signal line 4 is electrically connected with the driving circuit.

Since in the touch panel 1, the touch electrodes 2 can not only realize the touch function, but also serve as the common electrodes during the display, the display or the touch of the touch panel is performed in a time-shared manner. When the display is performed by the touch panel 1, the first signal lines 3 and the second signal lines 4 all receive a common electrode signal from the driving circuit. That is, during the display, the first signal lines 3 and the second signal lines 4 cooperate with each other so as to improve the uniformity of the electric field of the whole touch panel 1.

When the touch is performed by the touch panel, the first signal lines 3 provide touch signals to the touch electrodes 2. When a finger of a user touches the touch panel 1, part of the touch signals of the touch electrodes 2 at touch points would be taken away by the finger, and the charge of these touch electrodes 2 would be reduced. In this case, the driving circuit can easily determine the touch points when scanning the charge of the touch electrodes 2.

Figure 7:
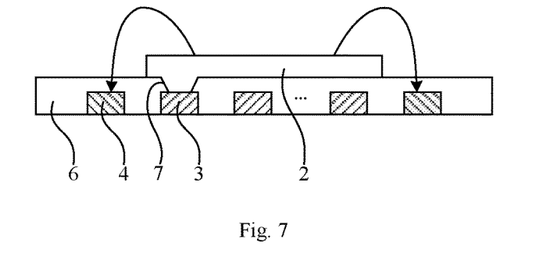
FIG. 7 schematically shows an electric field between the second signal lines and the touch electrodes according to an embodiment of the present disclosure.

According to the embodiment of the present disclosure, in order to avoid the mutual interference of two adjacent columns of touch electrodes, thereby reducing the touch accuracy of the touch panel 1 during the touch procedure, the second signal lines 4 that are arranged between two columns of touch electrodes are connected with the ground through the driving circuit. During the touch procedure, the touch electrodes 2 and the ground can form capacitors so as to store charges. Therefore, at this time, the electric potential of the touch electrodes 2 is a positive value, definitely not zero. As shown in FIG. 7, the electric field lines emitted by the touch electrodes 2 would fall on the adjacent second signal lines 4 which have a lower electric potential, so that the mutual interference of two adjacent columns of touch electrodes can be avoided.

Since the second signal lines 4 are arranged between two columns of touch electrodes, if the touch panel 1 is provided with n (n being a positive integer larger than 1) columns of touch electrodes, the number of the second signal lines 4 is n−1. If each of the second signal lines 4 is electrically connected with the driving circuit, with respect to the touch panel 1 with each column of touch electrodes comprising m touch electrodes 2, the driving circuit that is arranged on the touch panel 1 should be provided with (m+1)×n−1 output ends. In this case, the hardware requirement of the driving circuit is improved to a large extent, and thus the driving circuit has to be realized at a high cost.

In order to reduce the number of the output ends of the driving circuit, according to the embodiment of the present disclosure, the touch panel 1 is further provided with third signal lines 5 that are connected with the driving circuit. The number of the third signal lines 5 is two. The third signal lines 5 extend from the driving circuit at both sides, and surround the area that is provided with the touch electrodes 2 (i.e., the active area of the touch panel 1). The two third signal lines 5 are connected with each other at one end of the touch panel far from the driving circuit. In this structure, the second signal lines 4 each are electrically connected with the driving circuit through the third signal lines 5. At the same time, the second signal lines 4 do not need to be connected with the driving circuit directly, and are insulated from the driving circuit. Therefore, the number of the output ends of the driving circuit can be reduced to a certain extent, and thus the driving circuit can be realized at a low cost.

According to the embodiment of the present disclosure, in order to improve the structure compactness of the whole touch panel 1 and reduce the thickness of the touch panel 1, the first signal lines 3, the second signal lines 4, and the third signal lines 5 can be arranged in a same layer and be formed through one patterning procedure.

Further, the embodiment of the present disclosure provides a display device, which comprises the aforesaid touch panel.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A touch panel capable of avoiding mura, comprising a plurality of touch electrodes that are arranged in an array and are insulated from one another, and a driving circuit that is arranged at one end of the touch panel,
   wherein each touch electrode is connected with the driving circuit through a corresponding one of first signal lines, and is insulated from other ones of the first signal lines; and
   wherein each first signal line, after being electrically connected with a corresponding touch electrode, further extends toward the other end of the touch panel, so that each touch electrode overlaps with a group of first signal lines that are connected with a column of touch electrodes including said touch electrode; and
   wherein each column of touch electrodes comprises a first to an $m^{th}$ touch electrodes from bottom up, and a group of first signal lines that are connected with the column of touch electrodes comprise a first to an $m^{th}$ first signal lines from left to right, and the first signal lines are electrically connected to the touch electrodes in one of the following four manners:
   the first, the second, . . . , the $(m-1)^{th}$, and the $m^{th}$ ones of the first signal lines are electrically connected with the first, the second, . . . , the $(m-1)^{th}$, and the $m^{th}$ ones of the touch electrodes respectively; or
   the first, the second, . . . , the $(m-1)^{th}$, and the $m^{th}$ ones of the first signal lines are electrically connected with the $m^{th}$, the $(m-1)^{th}$, . . . , the second, and the first ones of the touch electrodes respectively; or
   the first, the third, the fifth, . . . ones of the first signal lines are electrically connected with the first, the second, the third, . . . ones of the touch electrodes respectively, and the second, the fourth, the sixth, . . . ones of the first signal lines are electrically connected with the $m^{th}$, the $(m-1)^{th}$, the $(m-2)^{th}$, . . . ones of the touch electrodes respectively; or
   the first, the third, the fifth, . . . ones of the first signal lines are electrically connected with the $m^{th}$, the $(m-1)^{th}$, the $(m-2)^{th}$, . . . ones of the touch electrodes respectively, and the second, the fourth, the sixth, . . . ones of the first signal lines are electrically connected with the first, the second, the third, . . . ones of the touch electrodes respectively.

2. The touch panel according to claim 1, wherein the touch electrodes and the first signal lines are arranged in different layers.

3. The touch panel according to claim 1, further comprising second signal lines that are arranged between any two columns of touch electrodes, wherein all the second signal lines are electrically connected with the driving circuit.

4. The touch panel according to claim 3, wherein the touch panel is used for display or touch in a time-shared manner;
   wherein when the touch panel is used for display, the first signal lines and the second signal lines all receive a common electrode signal from the driving circuit; and wherein when the touch panel is used for touch, the first signal lines receive a touch signal from the driving circuit, while the second signal lines are connected with the ground through the driving circuit.

5. The touch panel according to claim 4, further comprising third signal lines that are connected with the driving circuit,
wherein two third signal lines extending from the driving circuit surround an area that is provided with the touch electrodes, are connected with each other and with each second signal line at the other end of the touch panel; and
wherein the second signal lines each are insulated from the driving circuit and are electrically connected with the driving circuit through the third signal lines.

6. A display device capable of avoiding mura, comprising a touch panel capable of avoiding mura, which comprises a plurality of touch electrodes that are arranged in an array and are insulated from one another and a driving circuit that is arranged at one end of the touch panel,
wherein each touch electrode is connected with the driving circuit through a corresponding one of first signal lines, and is insulated from other ones of the first signal lines; and
wherein each first signal line, after being electrically connected with a corresponding touch electrode, further extends toward the other end of the touch panel, so that each touch electrode overlaps with a group of first signal lines that are connected with a column of touch electrodes including said touch electrode; and
wherein each column of touch electrodes comprises a first to an $m^{th}$ touch electrodes from bottom up, and a group of first signal lines that are connected with the column of touch electrodes comprise a first to an $m^{th}$ first signal lines from left to right, and the first signal lines are electrically connected to the touch electrodes in one of the following four manners:
the first, the second, ..., the $(m-1)^{th}$, and the $m^{th}$ ones of the first signal lines are electrically connected with the first, the second, ..., the $(m-1)^{th}$, and the $m^{th}$ ones of the touch electrodes respectively; or
the first, the second, ..., the $(m-1)^{th}$, and the $m^{th}$ ones of the first signal lines are electrically connected with the $m^{th}$, the $(m-1)^{th}$, ..., the second, and the first ones of the touch electrodes respectively; or
the first, the third, the fifth, ... ones of the first signal lines are electrically connected with the first, the second, the third, ... ones of the touch electrodes respectively, and the second, the fourth, the sixth, ... ones of the first signal lines are electrically connected with the $m^{th}$, the $(m-1)^{th}$, the $(m-2)^{th}$, ... ones of the touch electrodes respectively; or
the first, the third, the fifth, ... ones of the first signal lines are electrically connected with the $m^{th}$, the $(m-1)^{th}$, the $(m-2)^{th}$, ... ones of the touch electrodes respectively, and the second, the fourth, the sixth, ... ones of the first signal lines are electrically connected with the first, the second, the third, ... ones of the touch electrodes respectively.

7. The display device according to claim 6, wherein the touch electrodes and the first signal lines are arranged in different layers.

8. The display device according to claim 6, the touch panel further comprising second signal lines that are arranged between any two columns of touch electrodes, wherein all the second signal line are electrically connected with the driving circuit.

9. The display device according to claim 8, wherein the touch panel is used for display or touch in a time-shared manner;
wherein when the touch panel is used for display, the first signal lines and the second signal lines all receive a common electrode signal from the driving circuit; and
wherein when the touch panel is used for touch, the first signal lines receive a touch signal from the driving circuit, while the second signal lines are connected with the ground through the driving circuit.

10. The display device according to claim 9, the touch panel further comprising third signal lines that are connected with the driving circuit,
wherein two third signal lines extending from the driving circuit surround an area that is provided with the touch electrodes, are connected with each other and with each second signal line at the other end of the touch panel; and
wherein the second signal lines each are insulated from the driving circuit and are electrically connected with the driving circuit through the third signal lines.

* * * * *